United States Patent
Rosenbloom et al.

(10) Patent No.: US 7,467,162 B2
(45) Date of Patent: Dec. 16, 2008

(54) PRE-CONFIGURED SETTINGS FOR PORTABLE DEVICES

(75) Inventors: Oren Rosenbloom, Redmond, WA (US); Vladimir Sadovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/166,715

(22) Filed: Jun. 27, 2005

(65) Prior Publication Data

US 2006/0294209 A1 Dec. 28, 2006

(51) Int. Cl.
*G06F 17/00* (2006.01)
(52) U.S. Cl. .................. 707/104.1; 707/10; 709/220
(58) Field of Classification Search ............ 707/1–10, 707/100–104.1, 200–206; 709/217, 219, 709/220; 714/3
See application file for complete search history.

(56) References Cited

U.S. PATENT DOCUMENTS

| | | | | |
|---|---|---|---|---|
| 5,745,669 | A * | 4/1998 | Hugard et al. ............... 714/3 |
| 6,286,038 | B1 * | 9/2001 | Reichmeyer et al. ........ 709/220 |
| 6,598,057 | B1 * | 7/2003 | Synnestvedt et al. ........ 707/200 |
| 6,760,755 | B1 * | 7/2004 | Brackett ..................... 709/214 |
| 2002/0083156 | A1 * | 6/2002 | Wysoczynski .............. 709/219 |
| 2006/0106775 | A1 * | 5/2006 | Kuhn et al. .................... 707/3 |

OTHER PUBLICATIONS

Wai-Leung Cheung et al., Automatic device configuration and data validation through mobile communication, IEEE, vol. 1, Aug. 2003, 284-287.*

Drossu, R., A flexible graphical user interface for embedding heterogeneous neural network simulators, IEEE, vol. 39, Aug. 1996, 367-374.*

* cited by examiner

*Primary Examiner*—Jean B Fleurantin
(74) *Attorney, Agent, or Firm*—Shook, Hardy & Bacon LLP

(57) ABSTRACT

A system, method, and computer-readable media are disclosed for retrieving configuration files from host units to devices. The system, method, and computer-readable media can, through a media device, detect when a surrounding condition has changed so that the media device can benefit from at least one configuration file. If the media device determines that a change to a surrounding condition has occurred, the media device can then retrieve a configuration file from a designated host unit.

13 Claims, 4 Drawing Sheets

PRE-CONFIGURED SETTINGS FOR PORTABLE DEVICES

CROSS-REFERENCE TO RELATED APPLICATION

Not applicable.

BACKGROUND

Portable devices such as, but not limited to, digital cameras, video cameras, portable media players, cell phones, and GPS receivers can be fairly complicated devices. Portable devices that capture content (such as digital cameras) and portable devices that render content (such as media players) can have device settings that, when configured correctly, can greatly increase the quality of the user experience. For example, in the case of a digital camera, there are many device settings that can contribute to the quality of the captured photograph. Such settings for a digital camera could include aperture settings, exposure time, zoom mode, flash, etc. Furthermore, settings may only be applicable under certain conditions. In the digital camera example, a given configuration for a camera may only be applicable under certain environmental conditions. For example, a night time shot may require specific aperture and exposure times the result of which would be an excellent photograph of a night time scene. The same configuration may produce a poor snapshot during the day time. The problem arises as the average person, being an amateur to the art of photography, may not know how to correctly configure his/her digital camera to be able to take an optimal picture in any given environmental surrounding.

Portable devices are also playing an increasing role in the everyday lives of many people in the world as capacities and processing power increase. Many of these devices can operate independently of a personal computer. Portable devices in most cases can be personalized and customized in their operation to suit user preferences, including the cases when multiple users, family members for example, may use the device at different times. Most of the shared computers in households also maintain a collection of user preferences called a user profile. Just as it is desirable to maintain a collection of different user profiles with a personal computer, it would also be desirable to maintain a collection of user profiles with a portable device.

SUMMARY

A system is disclosed for retrieving configuration files from host units to media devices that overcomes the problems found in current technology. The system can include an interface for transmitting current properties and capabilities of a device to a host unit, with the interface also being adapted to automatically retrieve a configuration file from the host unit to the device. The system can also include a detection unit for detecting when to automatically retrieve the configuration file from the host unit. Moreover, the system can include a storage unit for storing the at least one configuration file on the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
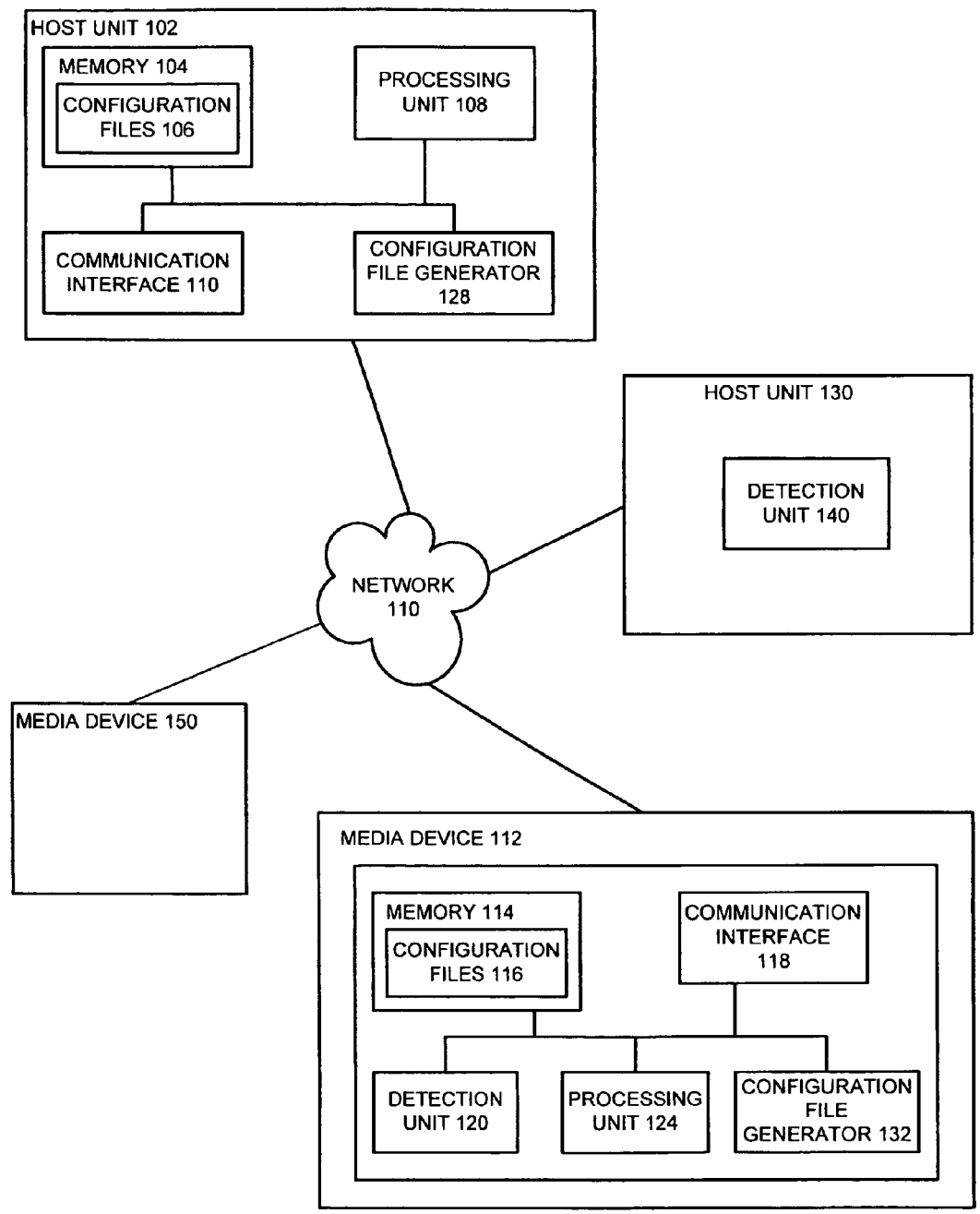
FIG. 1 illustrates a block diagram showing an embodiment of a system of the invention.

FIG. 1 is a block diagram showing an embodiment of a system of the invention. The system includes a plurality of host units 102 and 130 capable of communicating over a network 110 with a plurality of media devices 112 and 150. Host unit 102 can include servers, personal computers, and any other computing devices capable of communicating information to other devices through a communication interface. Host unit 102 can include, but is not limited to, memory 104, processing unit 108, communication interface 110, and configuration file generator 128. The communication interface 110 may be an interface that requires the media devices 112 and 150 to be directly plugged into the host unit 102 or allows the media devices to be connected to the host unit over the Internet. In an embodiment, the media devices 112 and 150 are connected to the host unit 102 via a wireless interface.

Configuration file generator 128 creates configuration files 106 that are stored in memory 104. Configuration files 106 can be generated to adjust and modify device properties and user-specific properties. Host unit 102 can manage configuration files 106 once the configuration files and generated and stored in memory 104. Managing the configuration files can include securing, backing up, and restoring the configuration files when needed. Device properties can include different settings of a media device that can be adjusted in order for a user to obtain a desired performance level for his media device. For example, such settings for a digital camera could include aperture settings, exposure time, zoom mode, flash, etc. User-specific properties can include preferences and settings that a user can create and adjust in order to form a user profile. The user profile can be stored and subsequently applied whenever a user successfully completes a login. For example, a user can create a user profile on a personal computer (PC) by adjusting user-specific properties such as color schemes, background wallpaper, font sizes, etc. The user profile can be stored as a configuration file for the specific user and can be applied whenever the user successfully completes a login. Once a configuration file, including device properties and user-specific properties, has been generated, the configuration file can be subsequently transmitted and applied to a media device. A method for generating configuration files 106 and subsequently transmitting and applying the configuration files to media devices will be discussed later.

Media devices 112 and 150 represent a plurality of media devices belonging to different categories. These media devices include digital still camera devices, digital video cameras (with or without still image capture functionality), portable media players such as personal music players and personal video players, cell phones (with or without media capturing/playback capabilities), automotive media systems, and other media devices. The media devices 112 and 150 will typically be divided into categories, each category having a distinct set of properties.

Media device 150 can generally include similar computing components found in media device 112. Media device 112 includes memory 114, processing unit 124, communication interface 118, detection unit 120, and configuration file generator 132. The communication interface 118 enables the media device 112 to interact with the host units 102 and 130 as well as media device 150. The communication interface 118 may be an interface that requires the media device 112 to be directly plugged into the host units 102, 130 and media device 150, or allows media device 112 to be connected to the host units and media device over the Internet. In an embodiment, the media device 112 is connected to the host units 102, 130, and media device 150 via a wireless interface.

Communication interface 118 allows media device 112 to communicate with host units and other media devices by sharing a common communication protocol. One such protocol is Media Transfer Protocol (MTP). MTP has been developed to manage content on any portable media device with storage. MTP is based upon an existing protocol, Picture Transfer Protocol (PTP), and can be implemented to be fully compatible with PTP. The primary purpose of MTP is to facilitate communication between devices that connect to a computer or other host, exchange data, and then disconnect for standalone use. A secondary purpose of MTP is to enable command and control of a connected device. This can include remote control of device functionality, monitoring of device-initiated events, and reading and setting device and user-specific properties.

Media device 112 may additionally include configuration file generator 132. Configuration file generator 132 may also be utilized to create configuration files within the media device 112. It can be advantageous to include a configuration file generator within the media device 112 for those users who are proficiently skilled to know how to configure certain settings within a media device to obtain a specific, optimum performance level for their media device.

Memory 114 can store configuration files 116. Configuration files 116 can represent configuration files that have been previously received from host unit 102 as well as configuration files generated from configuration file generator 132. Once a configuration file 106 is received from the host unit 102 and stored, the configuration file may be applied and subsequently stored according to terms dictated by either the host unit 102 or media device 112 before transmission of the configuration file. Once a configuration file has been created by configuration file generator 132, the configuration file 116 may be applied and subsequently stored according to the desires of the media device 112 or a user. A method for retrieving configuration files will be discussed later.

Detection unit 120 may be utilized to inform the media device when to automatically retrieve a configuration file 106 from host unit 102. The detection unit 120 may include sensors and logic to detect when a surrounding condition has changed so that the media device 112 can benefit from a configuration file. Such conditions can include a media device being connected to a host unit or another media device, a media device coming within a certain proximity of a host unit or another media device, and a change in an environmental condition including the lighting surrounding the media device becoming brighter or darker. A method for utilizing the detection unit 120 for determining when to automatically retrieve a configuration file will be discussed later.

Host unit 130 can include computing components similar to those found in host unit 102. Host unit 130 may additionally include detection unit 140. Host unit 130 can be a terminal, for example, in which a user possessing media device 112 can physically approach the host unit 130 and retrieve a configuration file 106. Detection unit 140 can include sensors and logic to monitor changing surrounding conditions. Such conditions can include a media device being connected to host unit 130, a media device coming within a certain proximity of host unit 130, and a change in an environmental condition including the lighting surrounding the host unit 130 becoming brighter or darker. The existence of a host unit including a detection unit that a user can physically approach can be advantageous for those users who may have a low-level media device that does not include a detection unit and cannot connect to a host unit over a wireless network.

Figure 2:
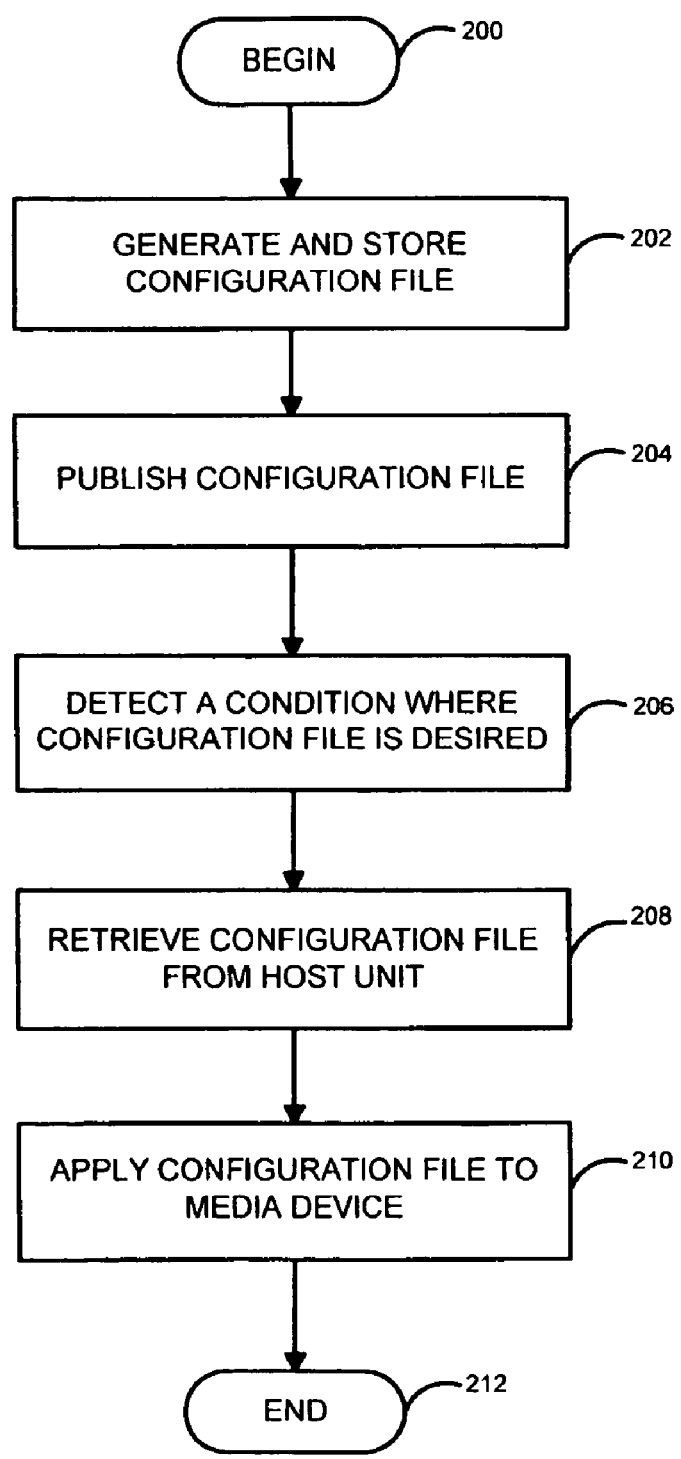
FIG. 2 illustrates a block diagram showing an embodiment for generating and retrieving configuration files.

The present invention enables the generation and storage of pre-configured device settings and user-specific settings in a configuration file that can be transferred directly to a media device such that the media device or a user of the media device can configure the device with those settings at any point in time either automatically or manually. FIG. 2 is a block diagram illustrating an embodiment for generating and retrieving configuration files within the present invention. With reference to FIGS. 1 and 2, in an embodiment, configuration files 106 can be generated 202 by configuration file generator 128 and then subsequently stored in memory 104. In such an embodiment, host unit 102 can be at a remote location and operated by a remote user. The remote user can create the configuration files 106 and offer them to users possessing relevant media devices. In an alternative embodiment, host unit 102 can be at a local location in which a user can operate both media device 112 and host unit 102. In such an embodiment, the user can create a configuration file 106 using configuration file generator 128. The user could connect the media device 112 and host unit 102 using the respective communication interfaces 118 and 128, and the user could utilize the configuration file generator 128 to interrogate the media device 112 for all of its possible properties and capabilities. Once the host unit 102 has obtained the media device's 112 properties and capabilities, the host unit could present these properties and capabilities to the user in a user interface on a graphical display. The user could then create a configuration file 106 using the graphical display and user input devices of the host unit 102 to simplify the generation process. In yet another embodiment, configuration files 116 can be generated by configuration file generator 132 and subsequently stored in memory 114. An advantage with this embodiment is that a user can take advantage of all the different properties and settings available on the media device and can adjust and modify these properties and settings in accordance with their own preferences. For example, a user operating a media device such as a digital still camera can use common controls to set aperture, exposure time, flash settings, zoom mode, etc., and can navigate through these settings by manipulating the lens a user interface of the media device. Once a configuration file 106 has been created by host unit 102 and before it is stored in memory 104, the configuration file 104 can be assigned a descriptive identifier that can be used to distinguish the configuration file 106.

Again with reference to FIGS. 1 and 2, once a configuration file 106 has been created and stored, the host unit 102 can then publish 204 the configuration file in order for the media device 112 to access the configuration file. In an embodiment in which a remote user has created the configuration file 106, the remote user can publish the configuration file on a on website, for example, that can be on the host unit 102 itself or that can be on another host unit. Configuration file 106 may additionally be published on another media device such that other media devices connected to the another media device can retrieve the configuration file.

Through use of detection unit 120, media device 112 can detect 206 when a surrounding condition has changed so that the media device can benefit from a configuration file 106. Such conditions can include a media device being connected to a host unit, a media device coming within a certain proximity of a host unit, and a change in an environmental condition including lighting surrounding the media device becoming brighter or darker. In determining whether a condition has changed, a media device 112 may include default configuration files that may have been pre-installed by a manufacturer of the media device. A user may alternatively set subsequently created or retrieved configuration files as default configuration files. A media device may include a plurality of default configuration files for a predetermined number of common conditions such as for a sunny day, a rainy day, night time, and for when a media device is not connected to another media device or host unit. Detection unit 120 can continuously measure current conditions surrounding the media device and compare the measured conditions to the previously-stored default configuration files that have been set by the user or by the manufacturer. In another embodiment, the detection unit 120 can periodically measure current conditions and compare the conditions to previously-stored default configuration files. If there is not a match between what is measured and the stored default configuration file, the detection unit can inform the media device 112 that a change in the surrounding conditions of the media device has occurred and the media device can automatically contact a host unit and retrieve a configuration file that meets its needs. In another embodiment, the media device 112 can search memory 114 to first determine if there exists a configuration file that meets its needs before contacting a host unit. Once a configuration file has been retrieved and applied, the newly applied configuration file can then become the default configuration file which the detection unit can compare subsequently measured conditions against.

As mentioned previously, host unit 130 may additionally include a detection unit 140. Again, host unit 130 can be a terminal, for example, in which a user possessing media device 112 can physically approach the host unit 130 and retrieve a configuration file 106. Detection unit 140 can also detect when a condition has changed so that the media device can benefit from a configuration file 106. Detection unit 140 may be optimized for a specific location in which the media device 112 happens to be located. Host unit 130 may be advantageous for those media devices that may not include a detection unit and cannot connect to a host unit over a wireless network. For example, a user may be at an amusement park and may possess a low-level disposable digital camera that does not include a detection unit and cannot connect to a host unit via a wireless connection. The user may desire to adjust his digital camera to account for the current environmental conditions outside but may not know how to skillfully do so. There can be a photography terminal located in the amusement park that can include a detection unit that can measure the current environmental conditions. The photography terminal can generate a configuration file in accordance with the current environmental conditions and capabilities of the user's digital camera for a user to download to his digital camera.

Once a detection unit 120 has determined that a certain surrounding condition has changed so that the media device can benefit from a configuration file 106, the media device 112 can automatically retrieve 208 the configuration file from host unit 102, or alternatively, media device 112 can automatically retrieve the configuration file from another media device. The specific host unit or another media device the media device 112 retrieves the configuration file from, in the case of an internet connection with a host unit or another media device, can be predetermined. This predetermined host unit or media device can be set by the media device's internet service provider (ISP), or can be set by the user of the media device. In another embodiment, media device 112 may first search memory 114 to observe whether there is a configuration file 116 that meets its needs before contacting a host unit 102 or another media device. If media device 112 does find a relevant configuration file 116 within its own memory 114, the media device can automatically retrieve and apply the configuration file 116 from its memory 114. Alternatively, a user of media device 112 can manually retrieve a configuration file without waiting for the detection unit 120 to detect a changed surrounding condition. For example, a user can simply contact a host unit, including visiting a web site of a host unit, and download a configuration file on demand.

Once a media device is ready to retrieve a configuration file 106 from host unit 102 or a configuration file from another media device, the configuration file can be transferred to the media device 112. Again, MTP is one example of a communication protocol that can be used to transfer the configuration file to the media device 112. When the media device connects to the host unit 102, the media device can tell the host unit the media device's properties and capabilities such as being able to change font size, color schemes, and wallpaper background, the different settings the media device contains, and which settings the media device can modify. The host unit can take the information regarding the media device's properties and capabilities and can build knowledge about the media device. The host unit can then intelligently prepare a configuration file for the media device based on whatever it learned from the media device when it connected to the media device. The host unit can then synchronize necessary settings, adjusted for the media device's capabilities, between a stored configuration file 106 on the host unit with the current state of the media device.

Once a configuration file is retrieved, the media device can parse the data within the configuration file and can automatically apply 210 the configuration file according to its needs. In an embodiment, the user of the media device 112 or the host unit 102 can determine how to apply the configuration file 106 prior to the host unit transferring the configuration file to the media device. For example, the user may decide that he wishes to simply store the profile on the media device for use sometime in the future. The user may alternatively direct the media device to apply the configuration file upon retrieval. The host unit, for example, can instruct the media device to apply the configuration file immediately and then discard the configuration file after use.

Figure 3:
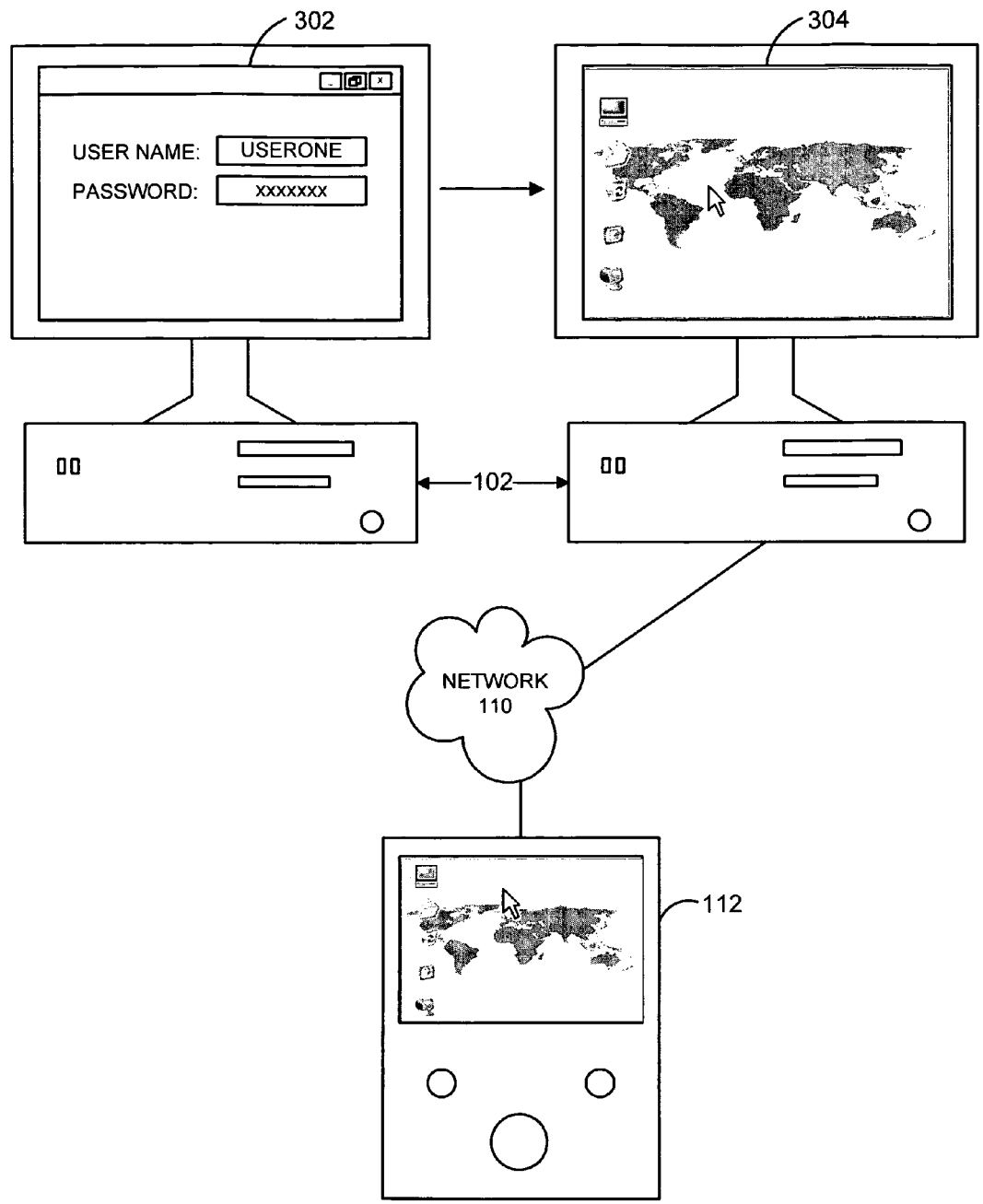
FIG. 3 illustrates an embodiment showing a user-specific configuration file being retrieved by a media device.

FIG. 3 illustrates an embodiment showing a user-specific configuration file being retrieved by a media device. Host units, such as personal computers, can be personalized and customized in their operation to suit user preferences, including cases when multiple users utilize the same host unit. Most shared host units can also maintain a collection of user preferences called a user profile. This user profile can be created on the host unit and stored as a user-specific configuration file on the host unit. When a media device connects to a host unit, the media device can automatically retrieve a user-specific configuration file through procedures outlined above in FIGS. 1 and 2.

In FIG. 3, for those users who have previously created and stored a user-specific configuration file on host unit 102, host unit 102 can prompt a user through graphical display 302 to complete a login in order to verify the user as an authorized user. In graphical display 302, a user with the username of "userone" can enter his username and password in order to be directed to his customized user profile. If the user successfully satisfies the login, the user-specific configuration file corresponding to the user profile for "userone" can be applied as shown in graphical display 304. Graphical display 304 illustrates an example of a customized desktop display that can be created by creating and storing a user-specific configuration file. Such a customized desktop display can be transmitted to media device 112 in the form of a user-specific configuration file by utilizing procedures discussed in FIG. 2. Once the user-specific configuration file is retrieved and applied by the media device 112, a user can be prompted on media device 112 to enter his username and password as similarly shown in graphical display 302. The same desktop display, including all other customized features of the user profile for "userone," can then be shown on the graphical display of the media device 112.

Figure 4:
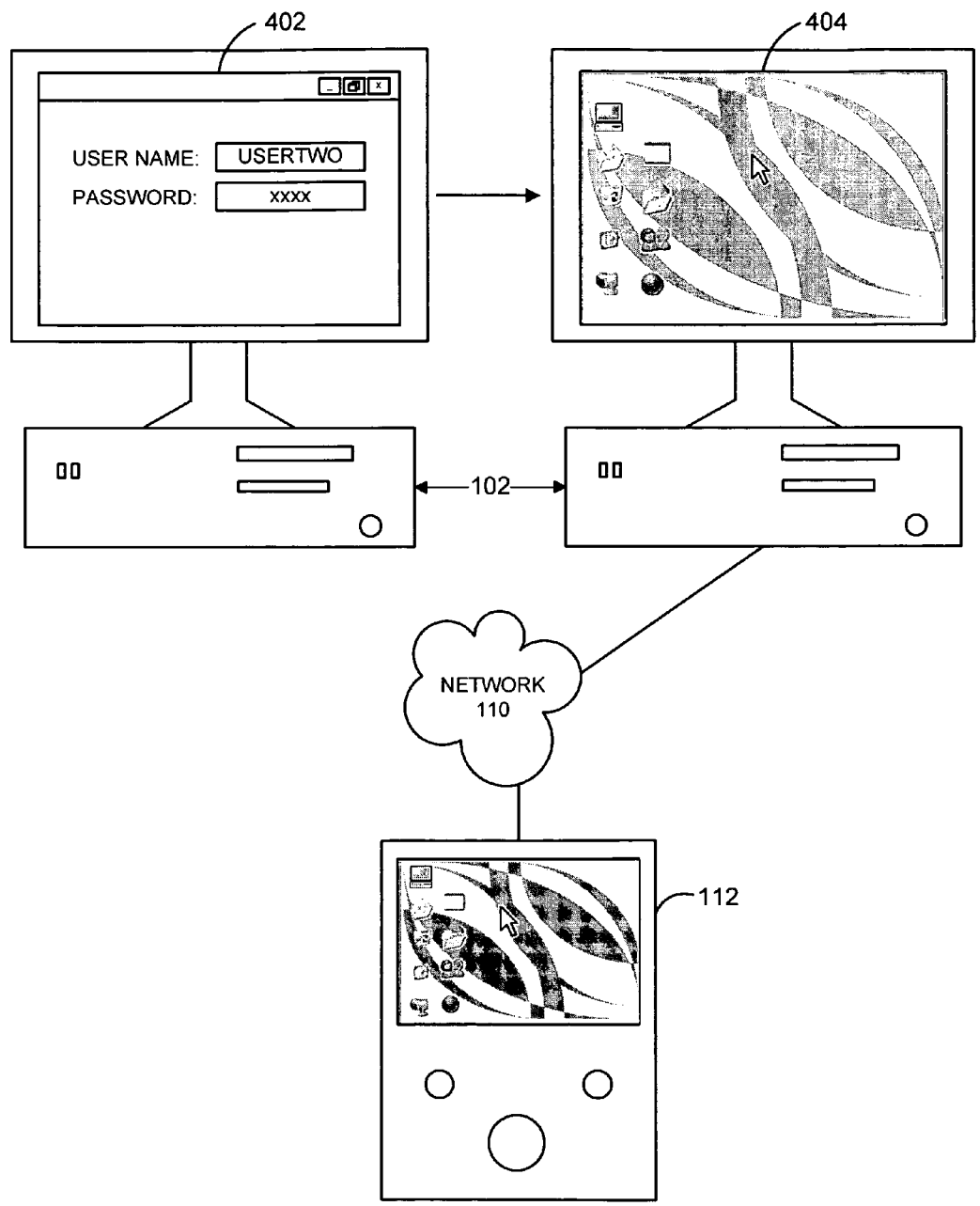
FIG. 4 illustrates another example showing a user-specific configuration file being retrieved by a media device.

FIG. 4 illustrates another example showing a user-specific configuration file being retrieved by a media device. FIG. 4 shows a second user with the username "usertwo" attempting to login onto the same host unit 102, as shown by graphical display 402, as the user with username "userone" from FIG. 3. The second user can also have a user profile stored on host unit 102 with a corresponding user-specific configuration file. Once the second user satisfies the login, the user-specific configuration file corresponding to the user profile for "usertwo" can be applied as shown in graphical display 404. Graphical display 404 illustrates an example of a customized desktop display that can be created by creating and storing a user-specific configuration file. Such a customized desktop display can be transmitted to media device 112 in the form of a user-specific configuration file by utilizing procedures discussed with reference to FIG. 2. Once the user-specific configuration file is retrieved and applied by the media device 112, a user can be prompted on media device 112 to enter his username and password as similarly shown in graphical display 402. The same desktop display, including all other customized features of the user profile for "usertwo," can then be shown on the graphical display of the media device 112.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A system including one or more computer memory that embodies components for retrieving configuration files from one or more host units to at least one device, the components comprising:
    an interface for transmitting at least one of current properties and capabilities of a device to a host unit, the interface also adapted to automatically retrieve at least one configuration file from the host unit to the device, wherein the at least one configuration file retrieved is based on the at least one of current properties and capabilities of the device;
    a detection unit for detecting when to automatically retrieve the at least one configuration file from the host unit, wherein the at least one configuration file is retrieved from the host unit when the detection unit detects that at least one surrounding condition has changed that requires the device to retrieve the at least one configuration file;
    wherein the detection unit detects that there is a change in the at least one surrounding condition by measuring the at least one surrounding condition and comparing to at least one previously-stored default configuration file;
    wherein the detection unit detects a change has occurred that requires retrieving the at least one configuration file when the at least one previously-stored default configuration file is not adapted to handle the measured surrounding condition; and
    a storage unit for storing the at least one configuration file on the device.

2. The system according to claim 1, wherein the at least one configuration file includes at least one group of pre-configured device property settings and a group of pre-configured user-specific property settings.

3. The system according to claim 1, wherein the at least one configuration file is managed by the host unit, wherein managing includes one or more of securing, backing up, and restoring the at least one configuration file.

4. The system according to claim 1, further comprising, before retrieving the at least one configuration file, at least one of the device and the host unit deciding between whether to apply the at least one configuration file immediately upon retrieval and whether to apply the at least one configuration file for use sometime in the future.

5. A method for retrieving configuration files from one or more host units to at least one device comprising:
    detecting when at least one surrounding condition of a device has changed by measuring the at least one surrounding condition and comparing to at least one previously-stored default configuration file;
    detecting that the at least one previously-stored default configuration file is not adapted to handle the at least one measured surrounding condition;
    automatically retrieving at least one configuration file from a host unit upon detecting that the at least one previously-stored default configuration file is not adapted to handle the at least one measured surrounding condition wherein the at least one configuration file retrieved is based on the changed surrounding condition and at least one of current properties and capabilities of the device, and wherein the at least one configuration file is retrieved through an interface between the host unit and the device; and
    storing the at least one configuration file retrieved from the host unit on the device.

6. The method according to claim 5, further comprising setting the at least one configuration file retrieved from the host unit as the new default configuration file.

7. The method according to claim 6, further comprising retrieving another configuration file when the detection unit detects that the new default configuration file is not adapted to handle subsequently measured surrounding conditions.

8. The method according to claim 5, further comprising manually retrieving the at least one configuration file from the host unit.

9. The method according to claim 5, further comprising, before retrieving the at least one configuration file, deciding between whether to apply the at least one configuration file immediately upon retrieval and whether to apply the at least one configuration file for use sometime in the future.

10. One or more computer memory with computer-executable instructions embodied thereon that when executed by a computing device perform a method for retrieving configuration files from one or more host units to at least one device comprising:

detecting when at least one surrounding condition of a device has changed;

detecting that the at least one previously-stored default configuration file is not adapted to handle the at least one measured surrounding condition;

automatically retrieving at least one configuration file from a host unit upon detecting that the at least one previously-stored default configuration file is not adapted to handle the at least one measured surrounding condition wherein the at least one configuration file retrieved is based on the changed surrounding condition and at least one of current properties and capabilities of the device, and wherein the at least one configuration file is retrieved through an interface between the host unit and the device;

wherein the at least one configuration file includes at least one group of pre-configured device property settings and a group of pre-configured user-specific property settings; and storing the at least one configuration file retrieved from the host unit on the device.

11. The computer memory according to claim 10, further comprising detecting that there is a change in the at least one surrounding condition by measuring the at least one surrounding condition and comparing to at least one previously-stored default configuration file.

12. The computer memory according to claim 10, further comprising pre-selecting the host unit from which the at least one configuration file is retrieved before detecting the at least one surrounding condition has changed.

13. The computer memory according to claim 10, further comprising transmitting information regarding the device's properties and capabilities to the host unit, the host unit synchronizing necessary settings between the at least one configuration file and a current state of the device.

* * * * *